United States Patent
Beardsley et al.

(10) Patent No.: US 6,381,677 B1
(45) Date of Patent: Apr. 30, 2002

(54) METHOD AND SYSTEM FOR STAGING DATA INTO CACHE

(75) Inventors: Brent Cameron Beardsley; Michael Thomas Benhase; Joseph Smith Hyde; Thomas Charles Jarvis; Douglas A. Martin; Robert Louis Morton, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/136,626

(22) Filed: Aug. 19, 1998

(51) Int. Cl.⁷ .............................................. G06F 12/12
(52) U.S. Cl. ...................... 711/137; 711/136; 711/113; 711/160
(58) Field of Search ................................ 711/113, 137, 711/136, 112, 160, 118

(56) References Cited

U.S. PATENT DOCUMENTS

| | | | |
|---|---|---|---|
| 4,437,155 A | | 3/1984 | Sawyer et al. |
| 4,458,316 A | | 7/1984 | Fry et al. |
| 4,467,421 A | * | 8/1984 | White ........................ 711/118 |
| 4,468,730 A | | 8/1984 | Dodd et al. |
| 4,489,378 A | | 12/1984 | Dixon et al. |
| 4,490,782 A | | 12/1984 | Dixon et al. |
| 4,533,995 A | | 8/1985 | Christian et al. |
| 4,571,674 A | * | 2/1986 | Hartung ...................... 711/160 |
| 4,574,346 A | * | 3/1986 | Hartung ...................... 711/112 |
| 4,583,166 A | | 4/1986 | Hartung et al. |
| 4,603,382 A | | 7/1986 | Cole et al. |
| 4,636,946 A | | 1/1987 | Hartung et al. |
| 4,875,155 A | | 10/1989 | Iskiyan et al. |
| 4,882,642 A | | 11/1989 | Tayler et al. |
| 4,956,803 A | | 9/1990 | Tayler et al. |
| 4,979,108 A | | 12/1990 | Crabbe, Jr.. |
| 5,134,563 A | | 7/1992 | Tayler et al. |
| 5,263,145 A | | 11/1993 | Brady et al. |
| 5,297,265 A | | 3/1994 | Frank et al. |
| 5,426,761 A | | 6/1995 | Cord et al. |
| 5,432,919 A | | 7/1995 | Falcone et al. |
| 5,432,932 A | | 7/1995 | Chen et al. |
| 5,434,992 A | | 7/1995 | Mattson |

(List continued on next page.)

FOREIGN PATENT DOCUMENTS

| | | |
|---|---|---|
| EP | 674263 | 3/1995 |
| JP | 6052060 | 2/1994 |

OTHER PUBLICATIONS

Improving Most Recently User Change Prefetching, IBM Technical Disclosure Bulletin, vol. 36, No. 08, Aug. 1993.
Optimized Look–Ahead Extension on Sequential Access, IBM Technical Disclosure Bulletin, vol. 39, No. 11, Nov. 1996.

(List continued on next page.)

*Primary Examiner*—Matthew Kim
*Assistant Examiner*—B. R. Peugh
(74) *Attorney, Agent, or Firm*—David W. Victor; Konrad Raynes Victor & Mann

(57) ABSTRACT

Disclosed is a system for caching data. After determining a sequential access of a first memory area, such as a direct access storage device (DASD), a processing unit stages a group of data sets from the first memory area to a second memory, such as cache. The processing unit processes a data access request (DAR) for data sets in the first memory area that are included in the sequential access and reads the requested data sets from the second memory area. The processing unit determines trigger data set from a plurality of trigger data sets based on a trigger data set criteria. The processing unit then stages a next group of data sets from the first memory area to the second memory area in response to reading the determined trigger data set.

21 Claims, 6 Drawing Sheets

U.S. PATENT DOCUMENTS

| | | | |
|---|---|---|---|
| 5,440,686 A | | 8/1995 | Dahman et al. |
| 5,440,727 A | | 8/1995 | Bhide et al. |
| 5,446,871 A | | 8/1995 | Shomler et al. |
| 5,481,691 A | | 1/1996 | Day, III et al. |
| 5,504,861 A | | 4/1996 | Crockett et al. |
| 5,551,003 A | | 8/1996 | Mattson et al. |
| 5,574,950 A | | 11/1996 | Hathorn et al. |
| 5,590,308 A | | 12/1996 | Shih |
| 5,592,618 A | | 1/1997 | Micka et al. |
| 5,606,688 A | | 2/1997 | McNutt et al. |
| 5,615,329 A | | 3/1997 | Kern et al. |
| 5,623,509 A | | 4/1997 | Shomler |
| 5,623,608 A | * | 4/1997 | Ng .............................. 711/137 |
| 5,627,990 A | | 5/1997 | Cord et al. |
| 5,636,359 A | | 6/1997 | Beardsley et al. |
| 5,651,136 A | | 7/1997 | Denton et al. |
| 5,867,685 A | * | 2/1999 | Fuld et al. .................. 711/113 |
| 6,049,850 A | * | 4/2000 | Vishlitzky et al. .......... 711/136 |

OTHER PUBLICATIONS

Direct Access Storage Device Cache Segment Management, IBM Technical Disclosure Bulletin, vol. 37, No. 08, Aug. 1994.

Cache System for Hard Disk System Utilizing the Access Data Address, IBM Technical Disclosure Bulletin, vol. 38, No. 01, Jan. 1995.

Direct Memory Access Paging and Remote DRAM Access Through an Optimized Memory Mapping Mechanism, IBM Technical Disclosure Bulletin, vol. 38, No. 06, Jun. 1995.

Non–Volatile Cache Storage Allocation Algorithm, IBM Technical Disclosure Bulletin, vol. 38, No. 12, Dec. 1995.

Fixed Storage Allocation of Input–Output Buffers, IBM Technical Disclosure Bulletin, vol. 39, No. 03, Mar. 1996.

Remote Copy Administrator's Guide and Reference, DFSMS/MVS Version 1, Third Edition, Jul. 1996, IBM Doc. No. SC35–0169–02.

Pinter and Yoaz; Tango: a Hardware–based Data Prefetching Technique for Superscalar Processors; Proceedings of the $29^{th}$ Annual IEEE/ACM International Symposium on Microarchitecture MICRO–29, Dec. 2–4, 1996, Paris France.

Patterson, et al.; Informed Prefetching and Caching: Proceedings of the $15^{th}$ ACM Symposium on Operating Systems Principles, Dec. 3–6, 1995, Copper Mountain Resort, Colorado.

Tomkins et al; Informed Multi Process Prefetching and Caching; Performance Evaluation Review Special Issue, vol. 25, No. 1, Jun. 1997—1997 ACM Sigmetrics Interantional Conference on Measurement and Modeling of Computer Systems.

Patterson and Gibson; Exposing I/O Concurrency with Informed Prefetching; Proceedings of the Third International Conference on Parallel and Distributed Information Systems, Sep. 28–30, 1994, Austin, Texas.

Shih, et al.; A File–Based Adaptive Prefetch Caching Design; Proceedings, 1990 IEEE International Conference on Computer Design: VLSI in Computers and Processors, Sep., 17–19, 1990, Hyatt Regency Cambridge, Cambridge, MA.

King, et al.; Management of a Remote Backup Copy for Disaster Recovery; ACM Transactions on Database Systems, vol. 16, No. 2, Jun. 1991, pp. 338–368.

U.S. Serial No. 09/149,052, filed Sep. 8, 1998 (Dkt. #TU9–98–014 18.23).

U.S. Serial No. 09/136,630, filed Aug. 19, 1998 (Dkt. #TU9–98–034 18.34).

U.S. Serial No. 09/135,842, filed Aug. 18, 1998 (Dkt. #TU9–98–033 18.35.

* cited by examiner

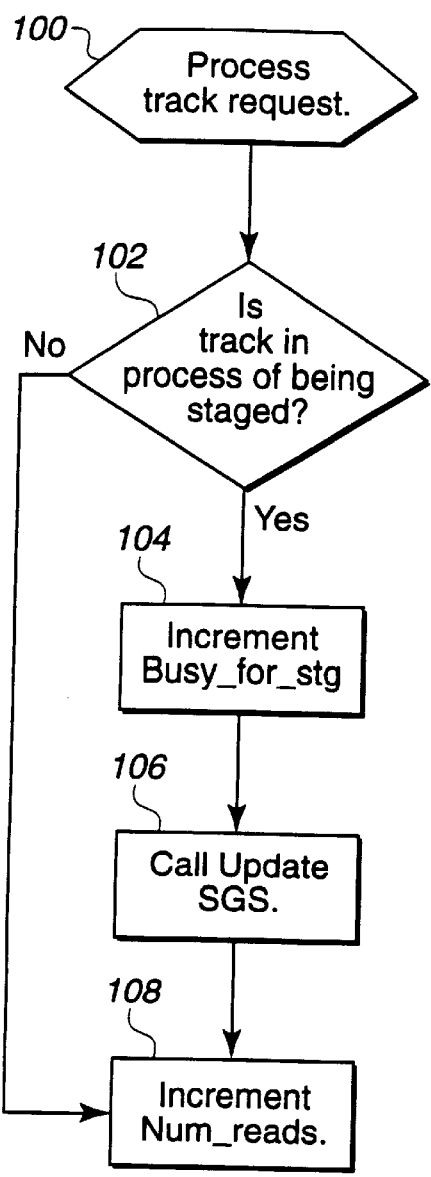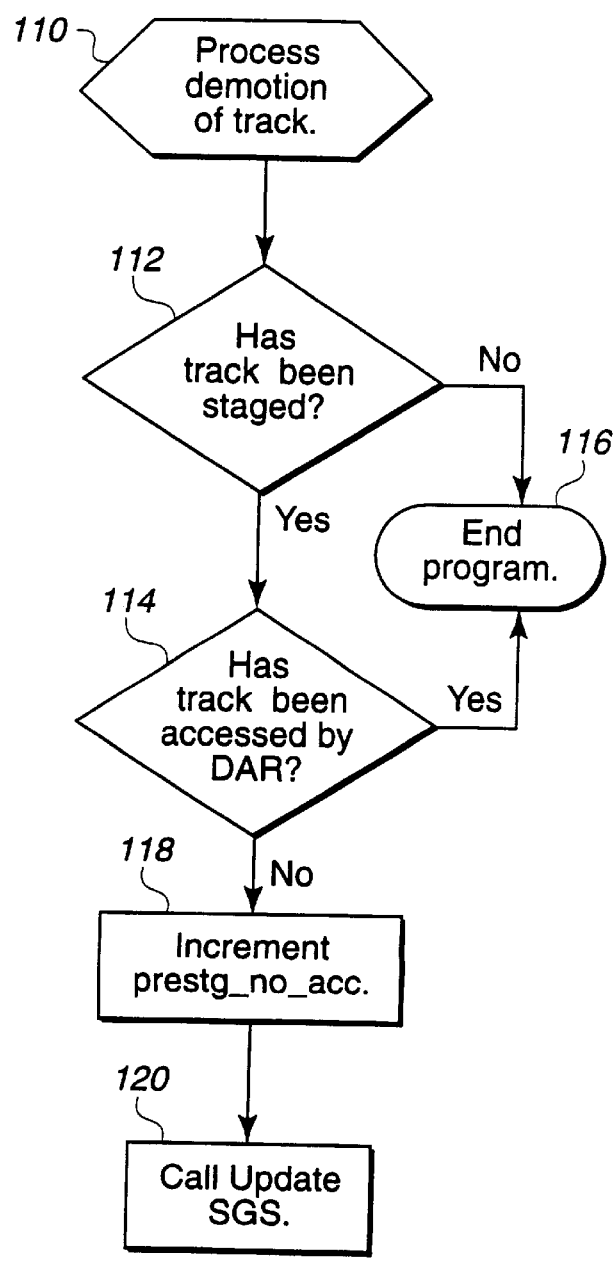

METHOD AND SYSTEM FOR STAGING DATA INTO CACHE

BACKGROUND OF THE INVENTION

1. Field of the Invention

The present invention relates to a method and system for staging data from a memory device to a cache and, in particular, staging data in anticipation of data access requests.

2. Description of the Related Art

In current storage systems, a storage controller manages data transfer operations between a direct access storage device (DASD), which may be a string of hard disk drives or other non-volatile storage devices and host systems and their application programs. To execute a read operation presented from a host system, i.e., a data access request (DAR), the storage controller must physically access the data stored in tracks in the DASD. A DAR is a set of contiguous data sets, such as tracks, records, fixed blocks, or any other grouping of data. The process of physically rotating the disk in the DASD to the requested track then physically moving the reading unit to the disk section to read data is often a time consuming process. For this reason, current systems stage data into a cache memory of the storage controller in advance of the host requests for such data.

A storage controller typically includes a large buffer managed as a cache to buffer data accessed from the attached DASD. In this way, data access requests (DARs) can be serviced at electronic speeds directly from the cache thereby avoiding the electromechanical delays associated with reading the data from the DASD. Prior to receiving the actual DAR, the storage controller receives information on a sequence of tracks in the DASD involved in the upcoming read operation or that data is being accessed sequentially. The storage controller will then proceed to stage the sequential tracks into the cache. The storage controller would then process DARs by accessing the staged data in the cache. In this way, the storage controller can return cached data to a read request at the data transfer speed in the storage controller channels as opposed to non-cached data which is transferred at the speed of the DASD device.

In prior art staging systems, a fixed number of tracks may be staged. In such fixed track staging systems, often one of the tracks being staged is already in cache. Other systems provide for staging data that will be subject to a sequential read operation, otherwise known as prestaging data. An example of a sequential prestaging routine to stage multiple tracks is described in U.S. Pat. No. 5,426,761, entitled "Cache and Sequential Staging and Method," which patent is assigned to International Business Machines Corporation ("IBM") and which is incorporated herein by reference in its entirety. U.S. Pat. No. 5,426,761 discloses an algorithm for sequential read operations to prestage multiple tracks into cache when the tracks are in the extent range of the sequential read operation, the track is not already in the cache, and a maximum number of tracks have not been prestaged into cache.

Tracks staged into cache may be demoted according to a Least Recently Used (LRU) algorithm to insure that the staged data in cache does not exceed a predetermined threshold. Current IBM storage controllers that stage data into cache are described in IBM publications "IBM 3990/9390 Storage Control Reference," IBM publication no. GA32-0274-04 (IBM Copyright, 1994, 1996), which publication is incorporated herein by reference and "Storage Subsystem Library: IBM 3990 Storage Control Reference (Models 1, 2, and 3)", IBM document no. GA32-0099-06, (IBM Copyright 1988, 1994).

One problem with current staging systems is the inability to adjust the rate of staging and/or the number of tracks staged to accommodate variances in DARs. If the number of tracks staged is not carefully controlled, then too many or too few tracks will be staged into cache. Staging too few tracks will delay responding to DARs because the response to the DAR will have to wait while the requested data is staged in from DASD. On the other hand, staging too much data into cache in advance of when the data is needed will result in wasted cache space. Further, if staged data is not accessed for a considerable period of time, then the staged data may be demoted according to a LRU algorithm. In such case, the demoted staged data will not be available for the anticipated DAR.

SUMMARY OF THE PREFERRED EMBODIMENTS

To overcome the limitations in the prior art described above, preferred embodiments disclose a system for caching data. After determining a sequential access of a first memory area, a processing unit stages a group of data sets from the first memory area to a second memory. The processing unit processes a data access request (DAR) for data sets in the first memory area that are included in the sequential access and reads the requested data sets from the second memory area. The processing unit determines a trigger data set from a plurality of trigger data sets based on a trigger data set criteria. The processing unit then stages a next group of data sets from the first memory area to the second memory area in response to reading the determined trigger data set.

In further embodiments, the processing unit receives a data access request (DAR), information indicating a range of data to be accessed, and a first data set number indicating a first data set of the data sets. The processing unit stages a group of data sets from the first memory area to a second memory area in response to processing the information. The processing unit then processes a data access request (DAR) for data sets in the first memory area that are in the range. Upon reading a data set indicated as a trigger data set, the processing unit stages a next group of data sets from the first memory area to the second memory area in response to reading the trigger data set.

In still further embodiments, the number of data sets in the group of data sets may be adjusted. The number of data sets in the group is decreased upon determining that a number of staged data sets demoted from the second memory area that have not been subject to a DAR exceed a first predetermined threshold. The number of data sets in the group is increased upon determining that a number of times requested data in a processed DAR are not staged to the second memory area exceeds a second predetermined threshold.

Preferred embodiments seek to balance two competing goals. The first goal concerns providing sufficient tracks in cache to continuously make data available to DARs from host systems and avoid a cache miss. A cache miss occurs when the cache does not include the data requested by the host. The second goal concerns conserving available memory space in cache. To accomplish this second goal, too much data cannot be staged into cache in advance of when the DAR will be received. Otherwise, the staged data will remain unaccessed in cache and consume cache space which could otherwise be made available for other operations.

BRIEF DESCRIPTION OF THE DRAWINGS

Referring now to the drawings in which like reference numbers represent corresponding parts throughout:

FIG. 5 illustrates logic to process a DAR request to check if a sufficient level of data is being staged in advance of sequential DARs in accordance with preferred embodiments of the present invention;

FIG. 6 illustrates logic to process a demotion of a track to determine if too many tracks are being staged in advance of the sequential DARs in accordance with preferred embodiments of the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
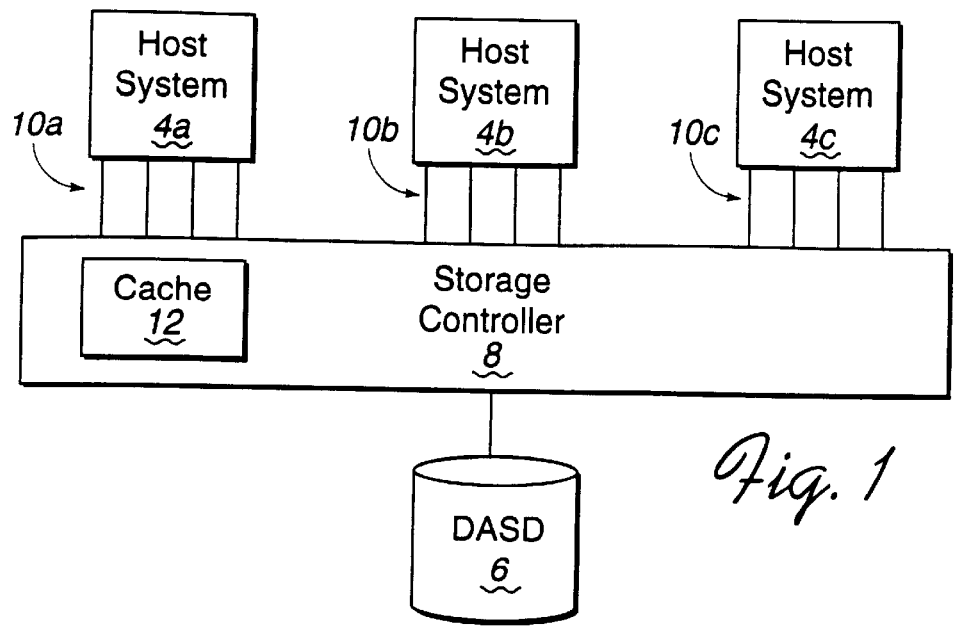
FIG. 1 is a block diagram illustrating a software and hardware environment in which preferred embodiments of the present invention are implemented.

FIG. 1 illustrates a hardware environment in which preferred embodiments are implemented. A plurality of host systems 4a, b, c are in data communication with a DASD 6 via a storage controller 8. The host systems 4a, b, c may be any host system known in the art, such as a mainframe computer, workstations, etc., including an operating system such as WINDOWS®, AIX®, UNIX®, MVS™, etc. AIX is a registered trademark of IBM; MVS is a trademark of IBM; WINDOWS is a registered trademark of Microsoft Corporation; and UNIX is a registered trademark licensed by the X/Open Company LTD. A plurality of channel paths 10a, b, c in the host systems 4a, b, c provide communication paths to the storage controller 8. The storage controller 8 and host systems 4a, b, c may communicate via any network or communication system known in the art, such as LAN, TCP/IP, ESCON®, SAN, SNA, Fibre Channel, SCSI, etc. ESCON is a registered trademark of International Business Machines Corporation ("IBM"). The host system 4a, b, c executes commands and receives returned data along a selected channel 10a, b, c. The storage controller 8 issues commands to physically position the electromechanical devices to read the DASD 6. In preferred embodiments, the structure of the storage controller 8 and interface between the storage controller 8 and host system may include aspects of the storage controller architecture described in the following U.S. patent applications assigned to IBM: "Failover System for a Multiprocessor Storage Controller," by Brent C. Beardsley, Matthew J. Kalos, Ronald R. Knowlden, Ser. No. 09/026,622, filed on Feb. 20, 1998; and "Failover and Failback System for a Direct Access Storage Device," by Brent C. Beardsley and Michael T. Benhase, Ser. No. 08/988,887, filed on Dec. 11, 1997, both of which applications are incorporated herein by reference in their entirety.

The storage controller further includes a cache 12. In preferred embodiments, the cache 12 is implemented in a high speed, volatile storage area within the storage controller 8, such as a DRAM, RAM, etc. The length of time since the last use of a record in cache 12 is maintained to determine the frequency of use of cache 12. The least recently used (LRU) data in cache 12 is demoted according to LRU or other cache memory management techniques known in the art. In alternative embodiments, the cache 12 may be implemented in alternative storage areas accessible to the storage controller 8. Data can be transferred between the channels 10a, b, c and the cache 12, between the channels 10a, b, c and the DASD 6, and between the DASD 6 and the cache 12. In alternative embodiments with branching, data retrieved from the DASD 6 in response to a read miss can be concurrently transferred to both the channel 10a, b, c and the cache 12 and a data write can be concurrently transferred from the channel 10a, b, c to both a non-volatile storage unit and cache 12.

Preferred embodiments may use different input/output (I/O) interfaces to transfer data among the host systems 4a, b, c, the storage controller 8, and the DASD 6. In the IBM ESA 390 system, which utilizes the IBM mainframe system, an I/O operation operates through the execution of a series of linked channel command words (CCW). The CCW designates the storage area associated with the operation, the action to be taken whenever transfer to or from the area is completed, and other options. In the IBM mainframe system, a Locate Record channel command is used to specify the operation, location and number of consecutive records or tracks to process. The Locate Record command includes a count parameter that specifies the number of records or tracks that will be accessed in the data transfer commands that follow the Locate Record command. Also included is a field including the seek address (cylinder and head, CCHH), which is the track where data transfer operations begin. The actual I/O operations follow the Locate Record command.

The Locate Record command is sent with a Define Extent command that specifies the first and last addressable tracks in the extent. The Define Extent command further includes a field defining attributes and limitations on the associated I/O operation. For instance, the Define Extent command includes a field indicating whether associated I/O operations are part of a sequential access operation. Details of the Locate Record and Define Extent commands are described in the IBM publication "IBM 3990 Storage Controller Reference," IBM document no. GA32-0099-06, which publication was incorporated herein by reference above.

Alternatively, preferred embodiments may be implemented using the Small Computer System Interface (SCSI). In SCSI, a request to transfer data is accomplished with commands such as PRE-FETCH, READ(6), READ(10), and READ LONG. All these commands request a device server, e.g., the storage controller 8, to transfer data from a device, e.g., the DASD 6, to a client, e.g., the host systems 4a, b, c. These commands include a logical block address and transfer length fields. The logical block address provides the address of the first fixed block address in the data request. The transfer length specifies the number of contiguous logical blocks of data to be transferred starting from the logical block address. SCSI commands are described in "Information Technology—SCSI-3 Block Commands (SBC)," published by ANSI, reference no. ANSI NCITS 306-199x (Rev. 8c, November 1997), which publication is incorporated herein by reference in its entirety.

Staging Data Into Cache

In preferred embodiments, data is staged from the DASD 6 into the cache 12 when the storage controller 8 is informed or detects an upcoming series of sequential data access requests. In this way, the storage controller 8 can return data to the read request from the faster cache 12 as opposed to physically accessing the DASD 6 to access the requested data. The read command may inform the storage controller 8 that the following read operation is part of a sequential operation comprising consecutive tracks to read. For instance, in the IBM mainframe environment, the Define Extent command indicates whether the following I/O operations are part of a sequential access. Alternatively, the storage controller 8 may utilize a predictive buffer memory management scheme to detect whether a sequence of data transfer operations are part of a sequential read command. Such predictive buffer memory management schemes are described in U.S. Pat. No. 5,623,608, entitled "Method and Apparatus for Adaptive Circular Predictive Buffer Management," assigned to IBM, and which patent is incorporated herein by reference in its entirety. These predictive memory buffer schemes may be used to detect sequential access for SCSI or mainframe type requests when the DARs do not specifically indicate whether the DAR is part of an ongoing sequential access.

A data access includes both sequential and non-sequential data access operations. In a data access that is not part of a sequential access operation, the storage controller 8 is provided a specific range of tracks, i.e., the intent count, to access. For instance, the Locate Record command and SCSI read command provide a count or transfer length field indicating blocks of data to access. The storage controller 8 will not access tracks beyond the range specified by the intent count. Alternatively, the storage controller 8 may receive a command indicating that data will be requested sequentially. For such sequential access operations where data will be accessed sequentially over a period of time, the storage controller 8 will prestage data until the storage controller 9 receives indication from another command or from predictive buffer management techniques that sequential access has ended.

In preferred embodiments, an "intent count" is determined from the information provided in the DAR indicating the number of units of blocks, records or tracks to transfer. In the IBM s390 environment, the intent count is determined from a count parameter in the Locate Record command which specifies the number of records or tracks in the data transfer command. In SCSI, the intent count may be determined from the transfer length command indicating the number of contiguous logical blocks to transfer.

Data is staged from the DASD 6 to cache 12 in "stage groups." A "stage group" is a number of sequential tracks, fixed blocks, stripes in a RAID system or any other data grouping, that are staged at a time to cache 12 from the DASD 6. The size of the stage group can vary. In the RAID environment, data is striped across multiple disks. For instance, in a 4+P RAID, four disks would store data blocks in a stripe unit and a fifth disk would store parity for the four data blocks. In this way a stripe includes all data blocks including the parity data for a parity group. In further embodiments, the DASD 6 may store the data in a format, such as Count Key Data (CKD) and the storage controller may receive a request in fixed blocks. In such case, the storage controller would translate the fixed block request to the CKD tracks in the DASD 6 to stage data into the cache 12.

The storage controller 8 transfers data from the cache 12 across the channels 10a, b, c to the host systems 4a, b, c. In a sequential data access request, after transferring the data across the channel 10a, b, c, the storage controller 8 would stage the next stage group in anticipation of the data to access. In this way, the storage controller 8 does not have to access data directly from the DASD 6 and instead may access the data for a DAR from the cache 12. In the SCSI environment, if the storage controller receives a READ command having a transfer length of 64 blocks, wherein each block is 512 bytes, the storage controller 8 can stage eight blocks at a time into the cache 12. While the storage controller 8 is transferring an eight block group across the channels 10a, b, c to the host system 4a, b, c, the storage controller 8 would stage the next eight blocks into cache 12.

The storage controller 8 also maintains a "trigger track," which is an offset track within a stage group that when processed directs the storage controller 8 to stage the next stage group into cache 12. When the storage controller 8 reads the trigger rack when processing a DAR, the storage controller 8 then stages the next stage group into cache 12. In this way, the storage controller 8 limits the amount of data staged in cache 12 by controlling the number of stage groups staged at a time and controlling when to stage by designating a trigger track. The trigger track must be selected to balance two competing goals: (1) stage sufficiently ahead, i.e., earlier in the stage group, so that there is sufficient data to accommodate subsequent DARs versus (2) delay staging to minimize cache 12 usage. To balance these goals, the storage controller 8 may maintain different trigger tracks for different types of hosts and for sequential versus non-sequential data access requests. To provide a slower stage process to accommodate slower transfers of data from the cache 12 to the channels 10a, b, c, the trigger track would be located closer to the end of the stage group versus a trigger track located closer to the beginning of the stage group when the transfer speed is high.

There are two factors that effect how quickly data is accessed from cache. The first factor concerns the speed of the channel 10a, b, c and the second factor concerns the type of access operation, e.g., sequential or non-sequential. With respect to the first factor, with hosts 4a, b, c having slower channels 10a, b, c, data transfer from the cache 12 to the host is longer and data remains staged in cache for a longer period of time. To accommodate slower hosts, the storage controller 8 can locate the trigger track closer to the end of the stage group, e.g., ten tracks from the end of the stage group, to delay staging of the next stage group. On the other hand, to accommodate hosts 4a, b, c having faster channel 10a, b, c data transfer rates, the storage controller 8 would locate the trigger track closer to the beginning of the stage group, e.g., an offset of 15 tracks, to stage the data into cache 12 earlier because the DARs are more frequent, thus requiring more data readily available in the cache 12.

With respect to the second factor, sequential data accesses are often accessed less frequently than non-sequentially accessed data. Sequential requests are often made when the host 4a, b, c is requesting blocks of data to set-up for an operation. In such case, the host 4a, b, c may not access the data immediately. On the other hand, non-sequential accesses are often for application access requests that need the entire block of requested data immediately in order to proceed. Thus, for sequential data accesses, the storage controller 8 can locate the trigger track closer to the end of the stage group to slow the stage rate. The stage rate may be slowed to accommodate the less frequent data accesses that occur during sequential accesses. Alternatively, for non-sequential accesses, the storage controller 8 can locate the trigger track closer to the beginning of the stage group to stage data sooner because with non-sequential accesses, the data accesses are more frequent.

The actual stage group size and trigger track locations may be determined empirically by performing test runs under different scenarios with different cache, storage controller, host, and DASD systems to select optimal trigger track and stage group sizes for a particular system architecture.

The storage controller 8 may also provide a "remaining intent count to stage" (RICP) value indicating the number of tracks, records or data blocks that remain to be staged for the intent count access range. When processing the trigger track, the storage controller 8 processes the RICP to determine whether the number of tracks remaining to be staged is less than the tracks that will be staged if the next stage group is staged. The storage controller 8 would only stage the next stage group to the extent that such a stage is needed to satisfy the intent count.

In preferred embodiments, each track staged into cache 12 may include a "stage ahead field" that indicates how many tracks sequentially following the track were staged into cache 12. For instance, if tracks 0 through 39 were staged, then the stage ahead field for track 30 in the cache 12 would indicate that the ten subsequent tracks are already in the cache 12. The storage controller 8 would utilize the stage ahead field to determine whether to stage a series of tracks into cache 12. If the storage controller 8 was about to stage a stage group and found that certain tracks from the stage group to stage were already in cache 12 as indicated by the stage ahead field, then the storage controller 8 would avoid staging those tracks already in cache 12. For instance, if the stage group size is 30 tracks, tracks 0–39 have been staged, and the trigger track is the 20th track in a stage group, then when the storage controller 8 reads the 20th track when processing a DAR, the storage controller 8 would check the stage ahead field for the last track in the stage group already staged, i.e., the 29th track, to determine how many tracks from the next stage group were already staged into cache 12. In the example, ten tracks in the next stage group, tracks 30 through 39 have been staged. In such case, the storage controller 8 would not have to stage all thirty tracks, tracks 30–59 from the next stage group and would only have stage those tracks, 40–59, that are not already in the cache 12.

The "stage ahead field" may be implemented as a data structure which includes an entry for each track and the number of tracks staged. Alternatively, each track in the cache 12 may include a control block section. In such case, the stage ahead field may be maintained in the directory entry in the control block for the track.

In preferred embodiments, the subsequent tracks already staged as indicated in the stage ahead field looks ahead no more than a single stage group, e.g., 30 tracks. Thus, if the stage group size was 30, the stage ahead field for each track would indicate no more than 30 tracks staged ahead. The reason for this limit is that the storage controller 8 only needs to determine what is staged ahead in the next stage group, not further stage groups, because the storage controller 8 is only dealing with staging the next stage group. In embodiments where the storage controller 8 is processing multiple DAR requests, different DAR requests may bring into cache 12 data that another DAR operation will want to access.

Process for Staging Data Into Cache

Figure 2A:
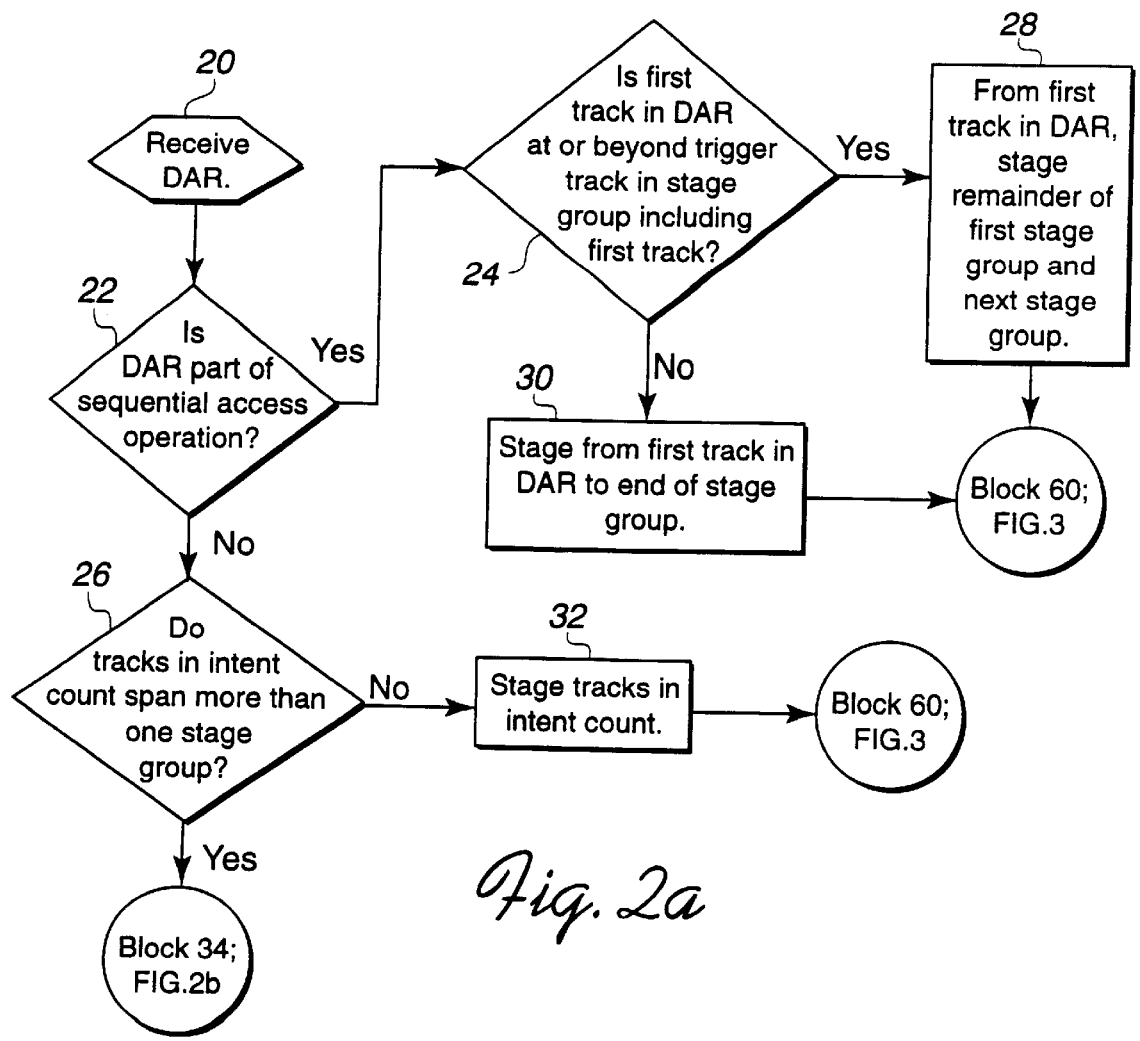
FIGS. 2a, b illustrate logic to set-up stage operations in response to receiving a data access request (DAR) in accordance with preferred embodiments of the present invention.
Figure 4:
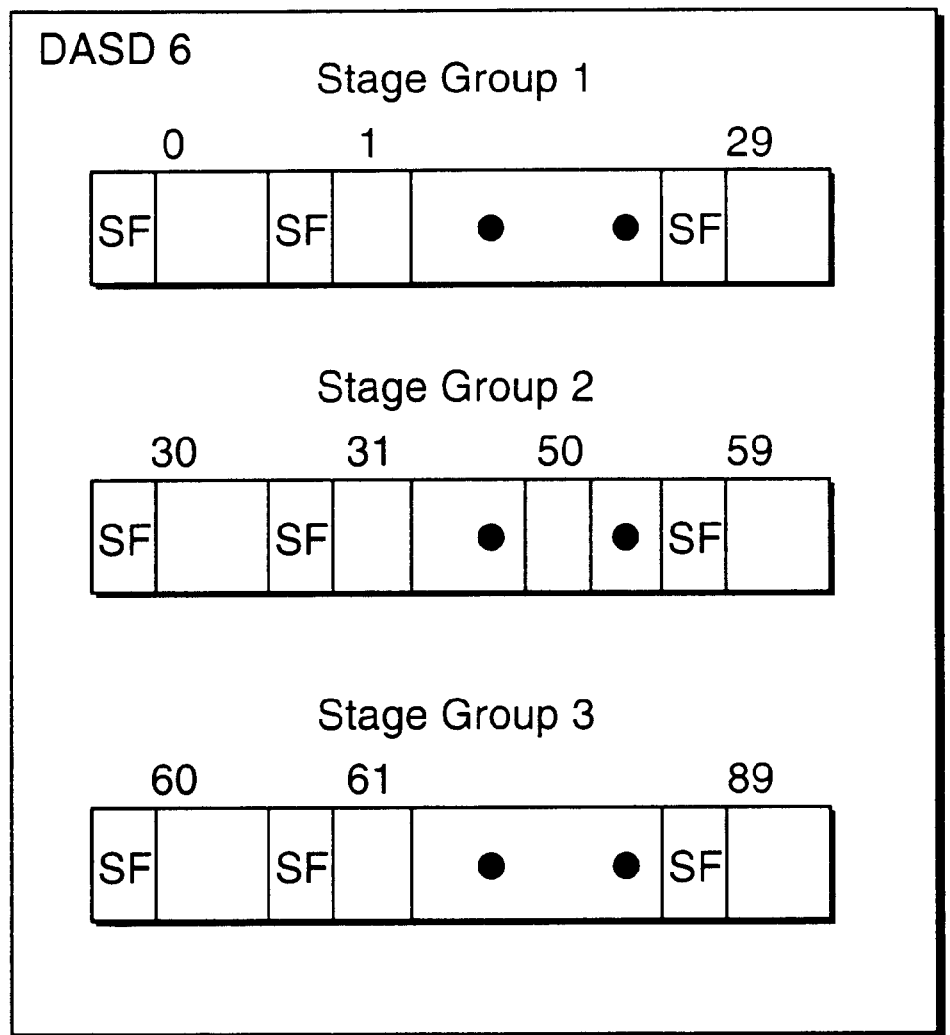
FIG. 4 illustrates how tracks in the DASD are arranged in stage groups in accordance with preferred embodiments of the present invention.

FIGS. 2*a*, *b* and 3 illustrate logic implemented in the mircrocode or software of the storage controller 8 to process a data access request (DAR) from a host system 4*a, b, c* and stage data. FIG. 4 illustrates a DASD 6 wherein the tracks are illustrated as located in three stage groups, wherein each stage group has thirty tracks and the trigger track is at the 20th track in a stage group.

With respect to FIG. 2*a,* control begins at block 20 which represents the storage controller 8 receiving a DAR. Control transfers to block 22 which represents the storage controller 8 determining whether the DAR is part of a sequential access operation. A sequential access operation may have a single DAR or multiple contiguous DARs. If so, control transfers to block 24; otherwise, control transfers to block 26. The storage controller 8 may read a record associated with the DAR, such as the Define Extent command, to determine whether the DAR is for a sequential accesses. Alternatively, the storage controller 8 can apply a predictive algorithm to determine whether the DAR is part of a series of sequential accesses.

At block 24, the storage controller 8 determines whether the first track in the DAR is at or beyond the trigger track in the stage group including the first track in the DAR. If so, control transfers to block 28 to stage tracks from the first track in the DAR to the end of the stage group including the first track and the following stage group. Otherwise, if the first track precedes the trigger track, control transfers to block 30 which represents the storage controller 8 staging from the first track in the DAR to the end of the stage group including the first track. For instance, with reference to FIG. 4, where the trigger track is at the 20th track, if the first track in the DAR was track 15 in stage group 1, then the storage controller 8 would copy tracks 15 through 29 in stage group 1 in the DASD 6 because the first track 15 precedes the trigger track, e.g., the 20th track in the stage group. If the first track in the DAR was track 22, then the storage controller 8 would stage tracks 22 through 29 and stage group 2 from the DASD 6 to the cache 12. From blocks 28 or 30, control then transfers to block 60 in FIG. 3 to process the DAR and return requested tracks to the channel 10*a, b, c* of the requesting host 4*a, b, c*.

Figure 2B:
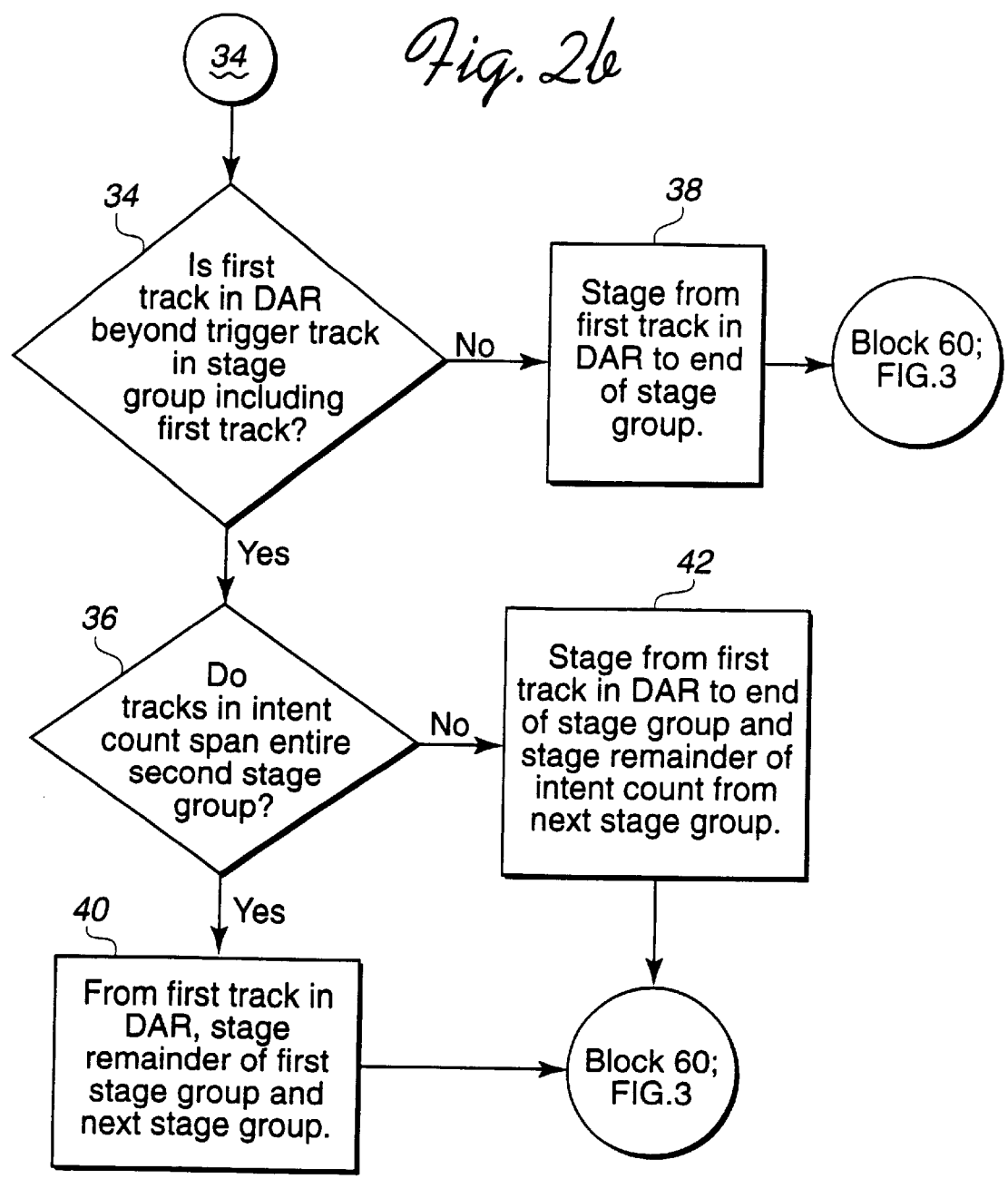
Figure 3:
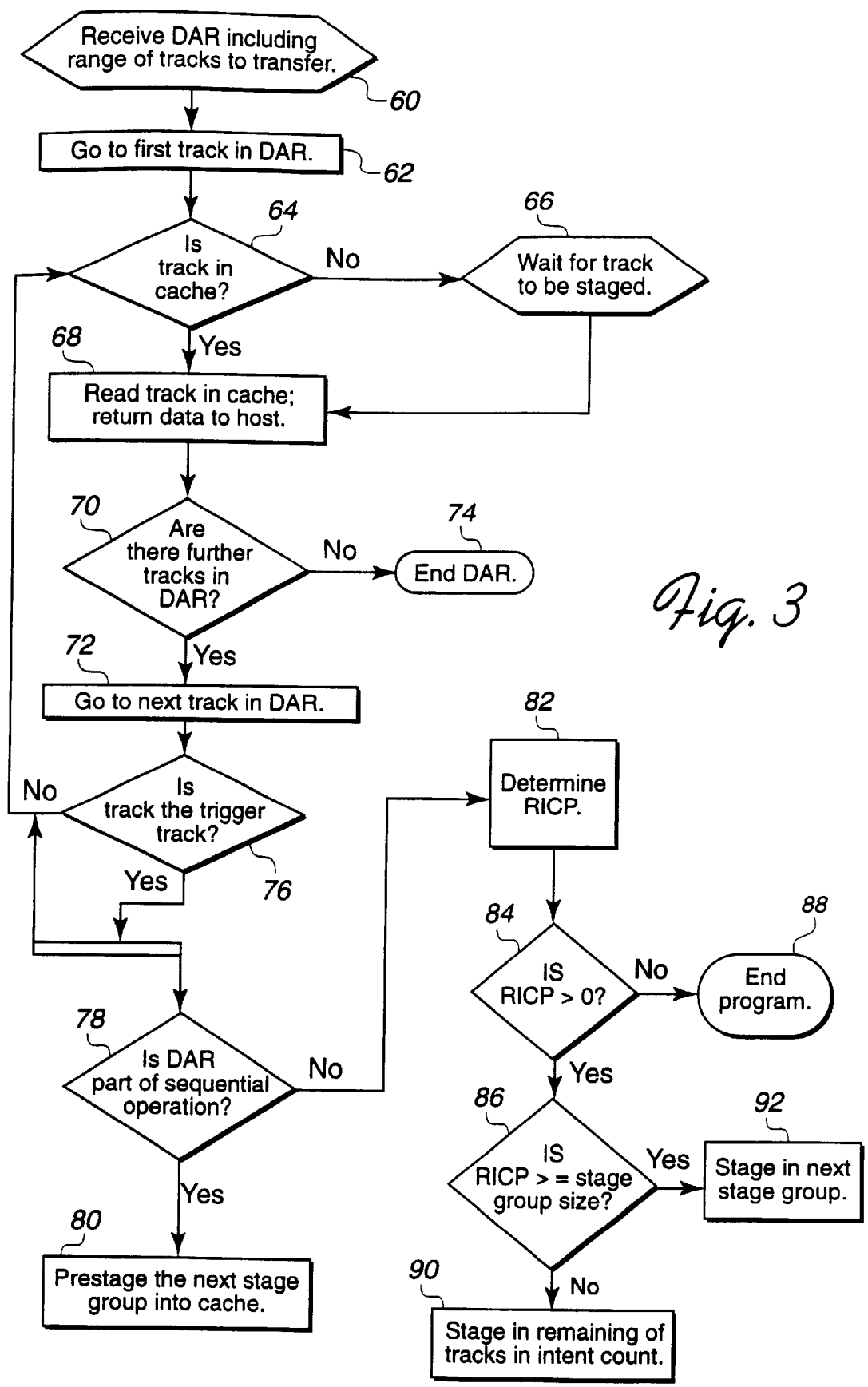
FIG. 3 illustrates logic to process the DAR in accordance with preferred embodiments of the present invention.

If the DAR is not part of a sequential access operation, i.e., is a non-sequential access, then control transfers to block 26 which represents the storage controller 8 determining whether the number of tracks in the intent count spans more than one stage group; otherwise, control transfers to block 60 in FIG. 3 to process the DAR. If the intent count spans more than one stage group, control transfers to block 34 in FIG. 2*b*. Otherwise, control transfers to block 32 to stage in the tracks in the intent count and then to block 60 in FIG. 3 to read the tracks in the DAR from cache 12. The storage controller 8 may transfer a read track to the channel 10*a, b, c* immediately after reading the track or wait to read a group of tracks from the cache 12 before transferring the group of tracks to the channel 10*a, b, c*.

If the number of tracks in the intent count spans more than one stage group, then control transfers to block 34 in FIG. 2*b* which represents the storage controller 8 determining whether the first track in the DAR is beyond the trigger track in the stage group including the first track. If so, control transfers to block 36; otherwise control transfers to block 38 which represents the storage controller 8 staging from the first track in the DAR to the end of the stage group. At block 36, the storage controller 8 determines whether the number of tracks in the intent count span the entire next stage group. If so, control transfers to block 40 to stage the remainder of the first stage group and the entire next stage group into cache. Otherwise, if the tracks in the intent count do not span the entire next stage group, then control transfers to block 42 which represents the storage controller 8 staging from the first track in the DAR to the end of the current stage group and staging the remainder of the intent count from the next stage group. From blocks 38, 40, and 42, which staged in data, control transfers to block 60 in FIG. 3.

FIG. 3 illustrates logic executed by the storage controller 8 to process a DAR and stage further data if necessary. Control begins at block 60 which represents the storage controller 8 processing the DAR to access a range of tracks. Control transfers to block 62 where the storage controller 8 accesses the first track in the DAR. Control transfers to block 64 which represents the storage controller 8 determining whether the accessed track in the DAR is in the cache 12. If not, control transfers to block 66 which represents the storage controller 8 waiting until the requested track is staged into the cache 12. The storage controller 8 may provide a copy of the requested track to the channel 10a, b, c and the cache 12 simultaneously. If the requested track is not in the process of being staged, then the storage controller 8 has staged the current track. Once the first track is staged at blocks 64 and 66, control transfers to block 68 which represents the storage controller 8 reading the track from the cache 12. The storage controller 8 may transfer a read track to the channel 10a, b, c immediately after staging the track or wait to finish staging a group of tracks from the DASD 6 before transferring the group of tracks to the channel 10a, b, c.

Control then transfers to block 70 which represents the storage controller 8 determining whether there are further tracks to transfer in the DAR If so, control transfers to block 72 to read the next track in the DAR; otherwise, if all tracks in the DAR were read, control transfers to block 74 to end the DAR. After accessing the next track in the DAR, control transfers to block 76 which represents the storage controller 8 determining whether the track is a trigger track. As discussed, different trigger tracks may be used depending upon the transfer rate between the host systems 4a, b, c and the storage controller 8, or whether the DAR is for a non-sequential or sequential access operation. If the considered track is not the trigger track, then control transfers back to block 64 et seq. to read the next track in the DAR. If the considered track is the trigger track then control transfers to two concurrent operations: back to block 64 to read the trigger track and to block 78 to determine whether the DAR is part of a sequential access operation. If the DAR is part of a sequential access, then control transfers to block 80 to prestage the following stage group into the cache 12.

If the DAR is not part of a sequential access, then control transfers to block 82 to determine the remaining intent count to stage (RICP) value, i.e., those tracks for the intent count access range that have not yet been staged. The RICP value may be maintained in a field that initially is set to the number of tracks in the intent count and decremented by the number of tracks staged whenever a stage occurs. Alternatively, the storage controller 8 may calculate the RICP for each determination at block 82. The storage controller 8 may calculate the RICP by determining a remaining intent count (RIC) which indicates those tracks in the intent count not yet transferred to the host system 4a, b, c. The RICP may be calculated from equation (1) as follows:

$$RICP=RIC-[\text{track number of the first track in the next stage group}-\text{current track number}] \qquad (1)$$

When the calculation of RICP is made, the "current track number" is the trigger track number which is the track number of the trigger track which is at a specified offset within the current stage group. The current track number is usually the trigger track number as these calculations are made upon detecting the trigger track to determine the scope of stage. The RIC can be determined from a counter which decrements the initial intent content by tracks transferred to the channel 10a, b, c.

Alternatively, the storage controller 8 can calculate the RIC from the number of tracks in the initial intent count minus the difference of the current track number and the first track of the intent count range. The storage controller 8 would maintain the number of tracks in the initial intent count and the first track in the intent count from the information provided in the Locate Record command, or the SCSI READ command. RIC can be calculated from equation (2) as follows.

$$RIC=\text{initial intent count}-(\text{current track number}-\text{track number of first track in intent count range}) \qquad (2)$$

The RICP can further be calculated from combining equations (1) and (2) to obtain the RICP in equation (3) as follows.

$$RICP=\text{initial intent count}-[(\text{track number of first track in next stage group})-(\text{track number of first track in intent count range})]. \qquad (3)$$

For instance, in the example of FIG. 4, if the first track in the intent count range is 0, the intent count range spans all 90 tracks in stage groups 1, 2, and 3. Assuming the trigger track in stage group 2 is at track 50, the storage controller 8 when reading track 50 may, at block 82, calculate the RICP by first calculating the RIC according to equation (2), RIC=90−(50−0)=40. Using equation (1), the storage controller 8 would calculate the RICP as follows: RICP=40−(60−50)=30. The storage controller 8 can determine the number of tracks staged from the starting track number in the next stage group not yet staged minus the first track in the intent count group range. Alternatively, using equation (3), RICP=90+0−60.

In another example, assume that the first track in the intent count range is track 20 and the storage controller is at trigger track 50 at block 82 determining the RICP. In such case, the initial intent count is 70, i.e., tracks 20 to 90. According to equation (2), the RIC=70−(50−20)=40. According to equation (1), the RICP=40−(60−50)=30. Alternatively, using equation (3), the RICP=70+20−60=30.

After determining the RICP, control transfers to block 84 which represents the storage controller 8 determining whether the RICP>0. If so, control transfers to block 86; otherwise, control transfers to block 88 to end the program as there are no more tracks in the intent count range to stage. Block 86 represents the storage controller 8 determining whether the RICP is greater than or equal to the stage group size. At block 86, the storage controller determines whether the next entire stage group or only a portion thereof needs to be staged. If only a portion of the next stage group needs to be staged to complete the staging of the tracks in the intent count, then control transfers to block 90 to stage the remaining number of tracks of the intent count access range into cache 12. Otherwise, if the remaining tracks of the intent count to stage (RICP) is greater than or equal to the stage group size, control transfers to block 92 to stage in all the tracks of the next stage group.

FIG. 4 further illustrates each track in the stage groups 1, 2, 3 as having a stage ahead field (SF). As discussed, in preferred embodiments, each track staged into cache 12 may include a "stage ahead field" that indicates how many tracks sequentially following the track were staged into cache 12. For instance, if tracks 0 through 40 were staged, then the stage ahead field for track 30 in the cache 12 would indicate that the ten subsequent tracks are already in the cache 12. In preferred embodiments, the stage ahead field would only include a value once the track is staged into cache 12. When staging data at blocks 32, 80, 90, and 92, the storage controller 8 may check the stage ahead field of the first track in the next stage group hat will be staged into cache 12 to determine if any of the tracks in the next stage group to be staged have already been staged into cache 12. For instance, with reference to FIG. 4, at trigger track 50, the storage controller 8 may examine the stage ahead field for track 59 to determine how many tracks ahead of track 59 have been staged. If thirty have been staged ahead, then the storage controller 8 would not stage the next stage group, having a size of thirty tracks, as the entire stage group is already in the cache 12. If only a portion of the next stage group is in cache 12, then the storage controller 8 would only stage those tracks in the next stage group that have not already been staged. In this way, the storage controller 8 can utilize the stage ahead field to avoid staging tracks already staged into cache 12.

Figure 7:
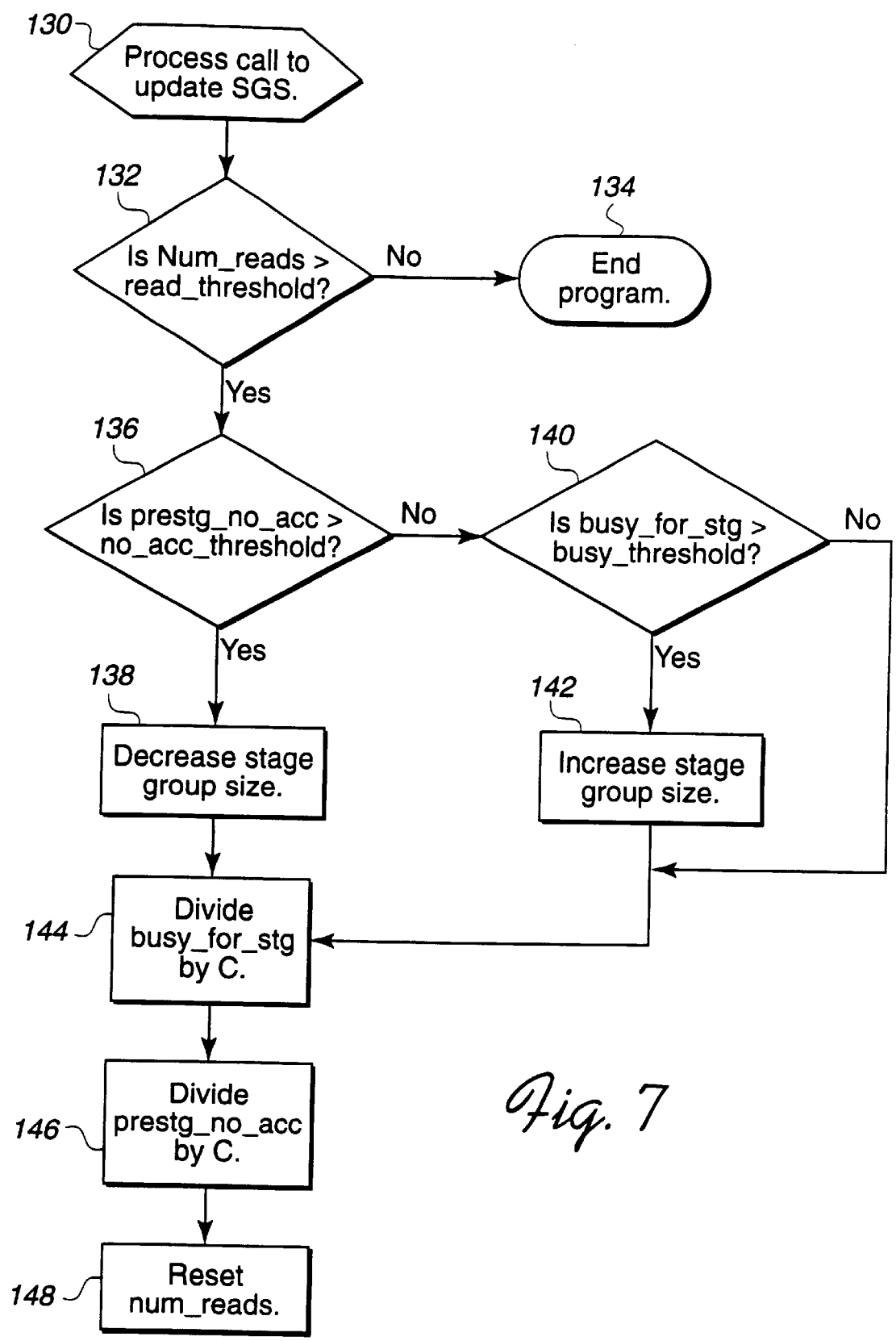
FIG. 7 illustrates logic to alter the stage group size to optimize the number of tracks being staged in accordance with preferred embodiments of the present invention.

In preferred embodiments, the storage controller 8 may adjust the stage group size to optimize the two competing goals: staging enough tracks so requested tracks are always available in cache and minimizing the number of tracks staged to conserve cache 12 resources. By reducing the stage group size, the storage controller reduces the number of tracks staged and increases the likelihood that the tracks needed for a subsequent DAR will not be available in cache 12. By increasing the stage group size, the storage controller 8 increases the likelihood that the tracks needed for any DAR will be available in cache 12. FIGS. 5, 6, and 7 illustrate logic implemented by the storage controller 8 to adjust the stage group size. The logic of FIGS. 5 and 6 maintains parameters that are used to trigger changes in the stage group size (SGS). These parameters include the busy__for__stg counter which indicates the number of times the storage controller 8 attempted to process a DAR and the requested tracks were being staged to the cache 12. The parameter prestg__no__acc indicates the number of times the storage controller 8 demoted a track from cache 12 that was staged and had not yet been accessed by a host system 4a, b, c.

FIG. 5 illustrates logic the storage controller 8 executes when processing a DAR. Control begins at block 100 which represents the storage controller 8 processing a DAR request. The logic of FIG. 5 may be executed simultaneously with the logic the storage controller 8 executes at block 64 in FIG. 3 when processing a track in the DAR. Control transfers to block 102 which represents the storage controller determining whether the subject track is in the process of being staged to cache 12, i.e., are not currently in cache 12. If the requested tracks are in the process of being staged, control transfers to block 104 which represents the storage controller 8 incrementing the busy__for__stg counter. After incrementing the busy__for__stg counter, control transfers to block 106 where the storage controller 8 executes the update SGS logic described with respect to FIG. 7 below. From block 102, when the requested track is already in cache 12, or block 106, control transfers to block 108 which represents the storage controller 8 incrementing a num__reads counter, indicating the number of DARs processed.

FIG. 6 illustrates logic the storage controller 8 executes when demoting a track from the cache 12. The storage controller 8 demotes tracks from cache 12 in response to processing a least recently used (LRU) algorithm or other memory management algorithm known in the art for demoting entries from cache 12. Control begins at block 110 which represents the storage controller 8 processing the demotion of a track. Control then transfers to block 112 which represents the storage controller 8 determining whether the track to be demoted has been staged. If so, control transfers to block 114; otherwise, control transfers to block 116 to end the program. At block 114, the storage controller 8 determines whether the track has been accessed by a host system 4a, b, c. Certain bytes in the track in cache 12 may indicate whether the track was promoted to cache 12 as part of a stage operation and indicate, when the track was staged, whether the staged track has been accessed in processing a DAR. If the track has been accessed by a DAR, control transfers to block 116 to end the program. Otherwise, if the track has not been accessed by a DAR, control transfers to block 118 which represents the storage controller incrementing the prestg__no__acc counter. Control then transfers to block 120 to call the update SGS program.

FIG. 7 illustrates preferred logic for the SGS update program the storage controller 8 calls when executing the logic of FIGS. 5 and 6. Control begins at block 130 which represents the storage controller 8 processing a call to the update SGS program. Control transfers to block 132 which represents the storage controller 8 determining whether the num__reads counter is greater than a read__threshold. The storage controller 8 will only adjust the stage group size (SGS) after a minimum number of reads (DARs) have been processed. Because adjusting stage group size can consume storage controller 8 resources, this minimum threshold insures that stage group size adjusting operations do not occur continuously and overburden the storage controller 8. If the num__reads is less than or equal to the threshold minimum, i.e., read__threshold, then control transfers to block 134 to end the SGS update program. Otherwise, if the threshold minimum has been crossed, control transfers to block 136 which represents the storage controller 8 determining whether the prestg__no__acc is greater than no__acc__threshold, i.e., whether the number of staged tracks at demotion that had not yet been accessed by a host system 4a, b, c __exceeds a threshold. If so, control transfers to block 138 which represents the storage controller 8 decreasing the stage group size. In preferred embodiments, the storage controller may decrease the stage group size by an amount empirically determined, such as a fixed number of tracks, records or stripes. Thus, the storage controller 8 decreases the stage group size after demoted tracks have been staged without being accessed too many times. This occurs when too many tracks are being staged into cache 12 far ahead of the need to service DARs.

If the prestg__no__acc threshold is less than or equal to the no__acc__threshold, i.e., tracks are not being staged ahead too often, then control transfers to block 140 which represents the storage controller 8 determining whether the busy__for__stg counter is greater than the busy__threshold, i.e., whether the requested tracks were being staged when the host requested the tracks a threshold minimum number of times. This means that not enough tracks are being staged to satisfy the frequency of sequential DARs from the host system 4a, b, c. If the busy__for__stg exceeds the threshold, then control transfers to block 142 to increase the stage group size to have more tracks staged and made available in cache 12 for DARs.

If at block 140, the storage controller 8 determines that the stage group size does not need to be adjusted, then control transfers to block 144. Control also transfers to block 144 after adjusting the stage group size at blocks 138 or 142. At block 144, the storage controller 8 divides the busy__for__stg value by a constant C, such as two. Control then transfers to block 146 which represents the storage controller 8 dividing the prestg_no_acc by the constant. In this way, the storage controller 8 requires that the prestg_no_acc and busy_for_stg counters be incremented an additional number of times equal to the amount reduced by the dividing constant before the storage controller 8 will again adjust the stage group size. Control then transfers to block 148 which represents the storage controller 8 resetting the num_reads to 0.

Alternative Embodiments and Conclusion

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to the IBM mainframe environment, where data is requested in tracks. However, those skilled in the art will appreciate that the preferred caching algorithms could apply to any data transfer protocol, including SCSI. For instance, in SCSI, a sector count is transferred to the storage controller which provides a range of sectors, i.e., fixed blocks, the read operation will operate upon. In such case, the intent count would be set to the sector count. The preferred embodiments may be utilized with any hard disk configuration known in the art, including interfaces such as ST-506/ST-412, IDE/ATA, Enhanced Small Device Interface (ESDI), floppy disk, parallel port, ATA, EIDE, ATA-2, Fast ATA, Ultra ATA, etc.

The logic of FIGS. 2–3 and 5–7 may be implemented as microcode or as part of an application the storage controller 8 executes. Alternatively, certain of the logic of FIGS. 2–3 and 5–7 may be performed by the host system 4a, b, c. The logic of FIGS. 2–3 and 5–7 is for illustrative purposes. Certain steps may be modified or removed altogether and other steps added. Further, the order of the steps performed may also vary from the described embodiments.

Preferred embodiments were often described in terms of tracks being staged and accessed, as well as altering the stage group size by track amounts. However, any data set, such as a fixed block CKD track, record, stripe, may be the unit that is accessed, staged, etc. Moreover, the trigger track may be a trigger data set comprising any grouping of data, e.g., CKD, fixed block, stripe, etc.

Preferred embodiments were described with respect to the staging of data from a DASD 6 to a cache 12. The preferred logic of FIGS. 2–3 and 5–7 could be used to stage data from any type of memory device, non-volatile as well as volatile, to another cache memory, which may be of a higher speed. For instance, data can be staged from a DRAM or RAM to a higher speed cache, such as a cache that is on-board the microprocessor, e.g., the L2 cache used with the PENTIUM (II microprocessor. PENTIUM II is a registered trademark of Intel Corporation.

In summary, preferred embodiments disclose a method for caching data. After determining a sequential access of a first memory area, a processing unit stages a group of data sets from the first memory area to a second memory. The processing unit processes a data access request (DAR) for data sets in the first memory area that are included in the sequential access and reads the requested data sets from the second memory area. The processing unit determines a trigger data set from a plurality of trigger data sets based on a trigger data set criteria. The processing unit then stages a next group of data sets from the first memory area to the second memory area in response to reading the determined trigger data set.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for caching data, comprising:
   determining a sequential access of a first memory area;
   staging a group of data sets from the first memory area to a second memory area after determining the sequential access;
   processing a data access request (DAR) for data sets in the first memory area that are included in the sequential access;
   reading the requested data sets from the second memory area;
   determining a trigger data set from a plurality of trigger data sets based on a trigger data set criteria, wherein the trigger data set criteria is determined from whether the DAR is a sequential DAR or a non-sequential DAR, wherein a first trigger data set is determined if the DAR is a sequential request and wherein a second trigger data set is determined if the DAR is a non-sequential request; and
   reading a requested data set indicated as the determined trigger data set; and
   staging a next group of data sets from the first memory area to the second memory area in response to reading the determined trigger data set.

2. The method of claim 1, wherein the step of staging a group of data sets further comprises the steps of:
   processing a data structure indicating for staged data sets a number of data sets following the staged data set that have been staged to the second memory area; and
   staging those data sets in the group that are not indicated in the data structure as already staged to the second memory area.

3. A method for caching data, comprising:
   determining a sequential access of a first memory area;
   staging a group of data sets from the first memory area to a second memory area after determining the sequential access;
   processing a data access request (DAR) for data sets in the first memory area that are included in the sequential access;
   reading the requested data sets from the second memory area;

determining a trigger data set from a plurality of trigger data sets based on a trigger data set criteria wherein the trigger data set criteria is determined from a data transfer rate of a device initiating the DAR, wherein a first trigger data set is determined if the device initiating the DAR is within a range of a first data transfer rate and wherein a second trigger data set is determined if the DAR is within a range of a second data transfer rate.

reading a requested data set indicated as the first or second determined trigger data set; and staging a next group of data sets from the first memory area to the second memory area in response to reading the first or second determined trigger data set.

4. A method for caching data, comprising:

determining a sequential access of a first memory area;

determining a trigger data set from a plurality of trigger data sets based on a trigger data set criteria;

staging a group of data sets from the first memory area to a second memory area after determining the sequential access by:
  (i) determining whether a first data set number indicating a first data set of the data sets precedes the trigger data set;
  (ii) staging the data sets from the first data set to the end of the group of data sets and the next group of data sets after determining that the first data set is after the trigger data set; and
  (iii) staging the data sets from the first data set to the end of the group of data sets after determining that the first data set is before the trigger data set, processing a data access request (DAR) for data sets in the first memory area that are included in the sequential access;

reading the requested data sets from the second memory area;

reading a requested data set indicated as the determined trigger data set; and staging a next group of data sets from the first memory area to the second memory area in response to reading the determined trigger data set.

5. A method for caching data, comprising:

determining a sequential access of a first memory area;

staging a group of data sets from the first memory area to a second memory area after determining the sequential access;

processing a data access request (DAR) for data sets in the first memory area that are included in the sequential access;

reading the requested data sets from the second memory area;

determining a trigger data set from a plurality of trigger data sets based on a trigger data set criteria; and reading a requested data set indicated as the determined trigger data set; and staging a next group of data sets from the first memory area to the second memory area in response to reading the determined trigger data set by:
  (i) determining a number of remaining data sets to stage of the data sets in a range of data sets to be accessed;
  (ii) determining whether the number of remaining data sets to stage in the range is greater than a number of data sets in the next group of data sets to stage;
  (iii) staging the remaining data sets to stage from the first memory area to the second memory area after determining that the number of remaining data sets to stage is less than the number of data sets in the next group; and
  (iv) staging the next group of data sets from the first memory area to the second memory area after determining that the number of remaining data sets to stage is greater than or equal to the number of data sets in the next group.

6. The method of claim 5, wherein the step of determining the number of remaining data sets to stage comprises:

determining a remaining number of data sets in the range from the range minus a number of data sets read when processing the DAR; and determining the number of remaining data sets to stage from the (number of remaining data sets in the range) minus (a data set number of the first data set in the next data set group) minus (a current data set number).

7. A method for caching data, comprising:

determining a sequential access of a first memory area;

staging a group of data sets from the first memory area to a second memory area after determining the sequential access;

processing a data access request (DAR) for data sets in the first memory area that are included in the sequential access;

reading the requested data sets from the second memory area;

determining a trigger data set from a plurality of trigger data sets based on a trigger data set criteria; and reading a requested data set indicated as the determined trigger data set; and staging a next group of data sets from the first memory area to the second memory area in response to reading the determined trigger data set; and adjusting a number of data sets in the group of data sets staged by performing the steps of:
  (i) determining whether a number of staged data sets demoted from the second memory area that have not been subject to a DAR exceeds a first predetermined threshold;
  (ii) decreasing the number of data sets in the group after determining that the number of demoted staged data sets not subject to a DAR exceeds the first predetermined threshold;
  (iii) determining whether a number of times requested data in a processed DAR are not staged to the second memory area exceeds a second predetermined threshold; and
  (iv) increasing the number of data sets in the group after determining that the number of times requested data was not staged to the second memory exceeds the second predetermined threshold.

8. A system for caching data, comprising:

a processing unit;

a first memory area;

a second memory area, wherein the processing unit is capable of communicating data between the first and second memory areas;

program logic executed by the processing unit, comprising:
  (i) means for determining a sequential access of a first memory area;
  (ii) means for staging a group of data sets from the first memory area to a second memory area after determining the sequential access;

(iii) means for processing a data access request (DAR) for data sets in the first memory area that are included in the sequential access;
(iv) means for reading the requested data sets from the second memory area;
(v) means for determining a trigger data set from a plurality of trigger data sets based on a trigger data set criteria; and
(vi) means for staging a next group of data sets from the first memory area to the second memory area in response to reading the determined trigger data set;
(vii) means for determining a number of remaining data sets to stage of the data sets in a range of data sets to be accessed;
(viii) means for determining whether the number of remaining data sets to stage in the range is greater than a number of data sets in the next group of data sets to stage;
(ix) means for staging the remaining data sets to stage from the first memory area to the second memory area after determining that the number of remaining data sets to stage is less than the number of data sets in the next group; and
(x) means for staging the next group of data sets from the first memory area to the second memory area after determining that the number of remaining data sets to stage is greater than or equal to the number of data sets in the next group.

9. The system of claim 8, wherein the program logic further comprises:
means for determining a remaining number of data sets in the range from the data sets in the range minus a number of data sets read when processing the DARs; and
means for determining the number of remaining data sets to stage from the (number of remaining data sets in the range) minus (a data set number of the first data set in the next data set group) minus (a current data set number).

10. A system for caching data, comprising:
a processing unit;
a first memory area;
a second memory area, wherein the processing unit is capable of communicating data between the first and second memory areas;
program logic executed by the processing unit, comprising:
(i) means for determining a sequential access of a first memory area;
(ii) means for staging a group of data sets from the first memory area to a second memory area after determining the sequential access;
(iii) means for processing a data access request (DAR) for data sets in the first memory area that are included in the sequential access;
(iv) means for reading the requested data sets from the second memory area;
(v) means for determining a trigger data set from a plurality of trigger data sets based on a trigger data set criteria; and
(vi) means for staging a next group of data sets from the first memory area to the second memory area in response to reading the determined trigger data set;
(vii) means for determining whether a number of staged data sets demoted from the second memory area that have not been subject to a DAR exceeds a first predetermined threshold;
(viii) means for decreasing the number of data sets in the group after determining that the number of demoted staged data sets not subject to a DAR exceeds the first predetermined threshold;
(ix) means for determining whether a number of times requested data sets in a processed DAR are not staged to the second memory area exceeds a second predetermined threshold; and
(x) means for increasing the number of data sets in the group after determining that the number of times requested data was not staged to the second memory exceeds the second predetermined threshold.

11. An article of manufacture for use in programming a processing unit to stage data from a first memory area to a second memory area, the article of manufacture comprising at least one computer readable storage device including at least one computer program embedded therein that causes the processing unit to perform:
determining a sequential access of the first memory area;
staging a group of data sets from the first memory area to the second memory area after determining the access;
processing a data access request (DAR) for data sets in the first memory area that are included in the sequential access;
reading the requested data sets from the second memory area;
determining a trigger data set from a plurality of trigger data sets based on a trigger data set criteria, wherein the trigger data set criteria is determined from whether the DAR is a sequential DAR or a non-sequential DAR, wherein a first trigger data set is determined if the DAR is a sequential request and wherein a second trigger data set is determined if the DAR is a non-sequential request; and
reading a requested data set indicated as the determined trigger data set; and staging a next group of data sets from the first memory area to the second memory area in response to reading the determined trigger data set.

12. An article of manufacture for use in programming a processing unit to stage data from a first memory area to a second memory area, the article of manufacture comprising at least one computer readable storage device including at least one computer program embedded therein that causes the processing unit to perform:
determining a sequential access of the first memory area;
staging a group of data sets from the first memory area to the second memory area after determining the access;
processing a data access request (DAR) for data sets in the first memory area that are included in the sequential access;
reading the requested data sets from the second memory area;
determining a trigger data set from a plurality of trigger data sets based on a trigger data set criteria, wherein the trigger data set criteria is determined from a data transfer rate of a device initiating the DAR, wherein a first trigger data set is determined if the device initiating the DAR is within a range of a first data transfer rate and wherein a second trigger data set is determined if the DAR is within a range of a second data transfer rate;
reading a requested data set indicated as the determined first or second trigger data set; and
staging a next group of data sets from the first memory area to the second memory area in response to reading the determined first or second trigger data set.

13. The article of manufacture of claim 12, wherein the step of staging a group of data sets further comprises the steps of:

processing a data structure indicating for staged data sets a number of data sets following the staged data set that have been staged to the second memory area; and staging those data sets in the group that are not indicated in the data structure as already staged to the second memory area.

14. An article of manufacture for use in programming a processing unit to stage data from a first memory area to a second memory area, the article of manufacture comprising at least one computer readable storage device including at least one computer program embedded therein tat causes the processing unit to perform:

determining a sequential access of the first memory area;

determining a trigger data set from a plurality of trigger data sets based on a trigger data set criteria;

staging a group of data sets from the first memory area to the second memory area after determining the sequential access by:

(i) determining whether a first data set number indicating a first data set of the data sets precedes the trigger data set;

(ii) staging the data sets from the first data set to the end of the group of data sets and the next group of data sets after determining that the first data set is after the trigger data set; and (iii) staging the data sets from the first data set to the end of the group of data sets after determining that the first data set is before the trigger data set;

processing a data access request (DAR) for data sets in the first memory area that are included in the sequential access;

reading the requested data sets from the second memory area;

reading a requested data set indicated as the determined trigger data set; and staging a next group of data sets from the first memory area to the second memory area in response to reading the determined trigger data set.

15. An article of manufacture for use in programming a processing unit to stage data from a first memory area to a second memory area, the article of manufacture comprising at least one computer readable storage device including at least one computer program embedded therein that causes the processing unit to perform:

determining a sequential access of the first memory area;

staging a group of data sets from the first memory area to the second memory area after determining the sequential access;

processing a data access request (DAR) for data sets in the first memory area that are included in the sequential access;

reading the requested data sets from the second memory area;

determining a trigger data set from a plurality of trigger data sets based on a trigger data set criteria; and reading a requested data set indicated as the determined trigger data set; and staging a next group of data sets from the first memory area to the second memory area in response to reading the determined trigger data set by:

(i) determining a number of remaining data sets to stage of the data sets in a range of data sets to be accessed;

(ii) determining whether the number of remaining data sets to stage is greater than a number of data sets in the next group of data sets to stage;

(iii) staging the remaining data sets to stage from the first memory area to the second memory area after determining that the number of remaining data sets to stage is less than the number of data sets in the next group; and (iv) staging the next group of data sets from the first memory area to the second memory area after determining that the number of remaining data sets to stage is greater than or equal to the number of data sets in the next group.

16. The article of manufacture of claim 15, wherein the step of determining the number of remaining data sets to stage comprises:

determining a remaining number of data sets from the range minus a number of data sets read when processing the DARs; and determining the number of remaining data sets to stage from (the number of remaining data sets in the range) minus (a data set number of the first data set in the next data set group) minus (a current data set number).

17. An article of manufacture for use in programming a processing unit to stage data from a first memory area to a second memory area, the article of manufacture comprising at least one computer readable storage device including at least one computer program embedded therein that causes the processing unit to perform:

determining a sequential access of the first memory area;

staging a group of data sets from the first memory area to the second memory area after determining the sequential access;

processing a data access request (DAR) for data sets in the first memory area that are included in the sequential access;

reading the requested data sets from the second memory area;

determining a trigger data set from a plurality of trigger data sets based on a trigger data set criteria; and reading a requested data set indicated as the determined trigger data set; and staging a next group of data sets from the first memory area to the second memory area in response to reading the determined trigger data set; and adjusting a number of data sets in the group of data sets staged by performing the steps of:

(i) determining whether a number of staged data sets demoted from the second memory area that have not been subject to a DAR exceeds a first predetermined threshold;

(ii) decreasing the number of data sets in the group after determining that the number of demoted staged data sets not subject to a DAR exceeds the first predetermined threshold;

(iii) determining whether a number of times requested data in a processed DAR are not staged to the second memory area exceeds a second predetermined threshold; and (iv) increasing the number of data sets in the group after determining that the number of times requested data was not staged to the second memory exceeds the second predetermined threshold.

18. A system for caching data, comprising:
   a processing unit;
   a cache;
   a storage area;
   program logic executed by the processing unit, wherein the program logic causes the processor to perform:
   (i) determining a sequential access of a first memory area;
   (ii) staging a group of data sets from the first memory area to a second memory area after determining the sequential access;
   (iii) processing a data access request (DAR) for data sets in the first memory area that are included in the sequential access;
   (iv) reading the requested data sets from the second memory area;
   (v) determining a trigger data set from a plurality of trigger data sets based on a trigger data set criteria wherein the trigger data set criteria is determined from a data transfer rate of a device initiating the DAR, wherein a first trigger data set is determined if the device initiating the OAR is within a range of a first data transfer rate and wherein a second trigger data set is determined if the DAR is within a range of a second data transfer rate.
   (vi) reading a requested data set indicated as the first or second determined trigger data set; and
   (vii) staging a next group of data sets from the first memory area to the second memory area in response to reading the first or second determined trigger data set.

19. The system of claim 18, wherein the first memory area is implemented within a magnetic storage medium and the second memory area is implemented within a volatile memory device.

20. The system of claim 18, wherein both the first and second memory areas are implemented in at least one volatile memory device.

21. The system of claim 18, wherein the second memory area further includes a data structure that indicates, for the staged data sets, a number of data sets following the staged data sets that have been staged to the second memory area, wherein the processing unit stages those data sets in the group that are not indicated in the data structure as already staged to the second memory area.

* * * * *

UNITED STATES PATENT AND TRADEMARK OFFICE
CERTIFICATE OF CORRECTION

PATENT NO. : 6,381,677 B1
DATED : April 30, 2002
INVENTOR(S) : Brent Cameron Beardsley et al.

It is certified that error appears in the above-identified patent and that said Letters Patent is hereby corrected as shown below:

Column 14,
Line 43, delete "and"

Column 15,
Lines 8 and 31, delete "." and insert -- ; -- therefore
Lines 54 and 56, delete "and"

Column 16,
Lines 30 and 32, delete "and"
Line 52, insert -- area -- after "memory" and before "exceeds"

Column 17,
Lines 8 and 60, delete "and"
Lines 48 and 51, delete "a" and insert -- the -- therefore Column 18,
Line 11, insert -- area -- after "memory" and before "exceeds"

Column 19,
Line 14, delete "tat" and insert -- that -- therefore
Line 58, delete "and"

Column 20,
Lines 43 and 45, delete "and"

UNITED STATES PATENT AND TRADEMARK OFFICE
CERTIFICATE OF CORRECTION

PATENT NO. : 6,381,677 B1
DATED : April 30, 2002
INVENTOR(S) : Brent Cameron Beardsley et al.

It is certified that error appears in the above-identified patent and that said Letters Patent is hereby corrected as shown below:

Column 21,
Line 22, delete "OAR" and insert -- DAR -- therefore

Column 22,
Line 2, delete "." and insert -- ; -- therefore

Signed and Sealed this

Twenty-eighth Day of September, 2004

JON W. DUDAS
*Director of the United States Patent and Trademark Office*